United States Patent [19]

Wilke et al.

[11] Patent Number: 4,680,982
[45] Date of Patent: Jul. 21, 1987

[54] CIRCULATING-BALL DRIVE

[76] Inventors: Richard Wilke, Am Weissenfeld 4, D-5830 Schwelm; Helmüt Korthaus, Fernblick 3, D-5600 Wuppertal 2, both of Fed. Rep. of Germany

[21] Appl. No.: 474,228

[22] Filed: Mar. 11, 1983

[30] Foreign Application Priority Data

Mar. 12, 1982 [DE] Fed. Rep. of Germany ....... 3209086

[51] Int. Cl.[4] ............................. F16H 1/18; F16H 1/20
[52] U.S. Cl. ................................. 74/424.8 R; 74/441; 74/459; 384/43; 384/516
[58] Field of Search ................. 74/424.8 A, 424.8 R, 74/441, 459; 384/43, 45, 516

[56] References Cited

U.S. PATENT DOCUMENTS

| | | | |
|---|---|---|---|
| 2,936,645 | 5/1960 | Morris et al. | 74/411 |
| 3,198,029 | 8/1965 | Orner | 74/424.8 A |
| 3,393,577 | 7/1968 | Better | 74/424.8 A |
| 3,563,107 | 2/1971 | Nilsson | 74/424.8 A |
| 3,902,377 | 9/1975 | Lemor | 74/424.8 R |
| 4,198,872 | 4/1980 | Metz | 74/424.8 NA |
| 4,364,282 | 12/1982 | Nilsson | 74/424.8 A |

FOREIGN PATENT DOCUMENTS

| | | | |
|---|---|---|---|
| 2810001 | 9/1978 | Fed. Rep. of Germany | 74/424.8 R |
| 2805141 | 8/1979 | Fed. Rep. of Germany | 74/424.8 R |
| 2928717 | 1/1981 | Fed. Rep. of Germany | 74/424.8 R |
| 2414141 | 9/1979 | France | 74/424.8 R |
| 1440635 | 6/1976 | United Kingdom | 74/424.8 R |
| 264079 | 10/1970 | U.S.S.R. | 74/424.8 A |
| 486171 | 9/1975 | U.S.S.R. | 74/424.8 A |
| 529320 | 12/1976 | U.S.S.R. | 74/424.8 R |

OTHER PUBLICATIONS

"Rechnergestützte Auslegung Und Berechnung Von Kugelgewindespindeln" by H. Hilmer, published in vol. II of Fertigungstechnische Berichte, 1978.

*Primary Examiner*—Lawrence J. Staab
*Attorney, Agent, or Firm*—Karl F. Ross; Herbert Dubno

[57] ABSTRACT

A spindle or leadscrew and an associated nut, forming part of a driving assembly of the circulating-ball type, have helical threads of symmetrical profiles in the shape of pointed arches whose flanks engage the recirculating balls along respective helical contact lines. With the spindle virtually non-deformable in the axial direction, the pitch of its thread exceeds that of the nut thread (in the absence of stress upon the latter) by a small differential—specifically 0.02%—lying well within the limits of elastic axial deformability of the nut. Upon rotation of the spindle relative to the nut for the transmission of an axial force, this differential results in an approximately uniform stress distribution among the sets of balls lying in confronting turns of the spindle and nut threads.

4 Claims, 3 Drawing Figures

CIRCULATING-BALL DRIVE

FIELD OF THE INVENTION

Our present invention relates to a circulating-ball drive in which a spindle or leadscrew and an associated nut coact with interposed bearing balls which are guided in an outer helical groove of the spindle and an inner helical groove of the nut. The turns of the latter groove form part or one or more closed tracks for the recirculation of these balls, e.g. as described in our prior U.S. Pat. Nos. 3,942,846 and 4,080,011.

BACKGROUND OF THE INVENTION

Such circulating-ball drives have become increasingly popular in recent years, thanks to their low-friction coupling of the relatively rotatable members. It is commonly accepted that the load should be distributed as uniformly as possible among all the balls, that these balls should have substantially identical diameters and that the grooves of the spindle and the nut should be of constant cross-section throughout their lengths while being of the same pitch in both members. This has been pointed out in a comprehensive study by H. Hilmer, titled *Rechnergestützte Auslegung und Berechnung von Kugelgewindespindeln*, appearing in Vol. 11 of the German series called *Fertigungstechnische Berichte* edited by Prof. Hans Kurt Tönshoff, published 1978 by Technischer Verlag Resch KG in the German Federal Republic.

As particularly discussed on page 79 of that publication, section 5.3.1., the stress exerted upon the balls in the several turns of the nut groove is not uniform under the aforestated conditions. According to the study, as specifically noted in sections 5.4–5.5 on pages 94–100 of that publication, a uniformization of the stress could be achieved by varying the outer diameter and thus the cross-sectional area of the nut, by modifying the flanks of the groove profile from one turn to the next in order to change the relative bending resistance of the intervening ribs, or by using balls of different diameters in the several turns (which of course calls for a separate recirculation passage for each turn). The author has found, however, that these proposed solutions are fully effective only for a limited load range; the corresponding discussion appears on pages 99–100 of the cited publication.

OBJECT OF THE INVENTION

The object of our present invention, therefore, is to provide an improved circulating-ball drive which does not require individual machining of different turns of a helical groove, enables the use of identical bearing balls in the entire assembly and substantially equalizes the stress destribution among these balls over a wide range of loads.

SUMMARY OF THE INVENTION

Our invention is applicable to an assembly of the type referred to in which the spindle or leadscrew, whose outer helical groove has a multiplicity of turns of uniform cross-section, is virtually nondeformable in both the axial and the radial direction while the associated nut, whose inner helical groove has a lesser number of turns also of uniform cross-section, is only axially deformable within certain limits of elasticity. Each turn of each groove has a profile of two symmetrical flanks engaging a set of bearing balls—confined between that turn and a confronting turn of the opposite groove—along a helical contact line whereby each confined ball is in two-point contact with the spindle and with the nut, as known per se. According to our present improvement, the turns of the outer groove have a pitch which exceeds by a small fraction the pitch of the turns of the inner groove in an unstressed state of the assembly The difference in pitch should be very small, generally on the order of one hundredth of 1%.

BRIEF DESCRIPTION OF THE DRAWING

The above and other features of our invention will now be described in detail with reference to the accompanying drawing in which.

SPECIFIC DESCRIPTION

Figure 1:
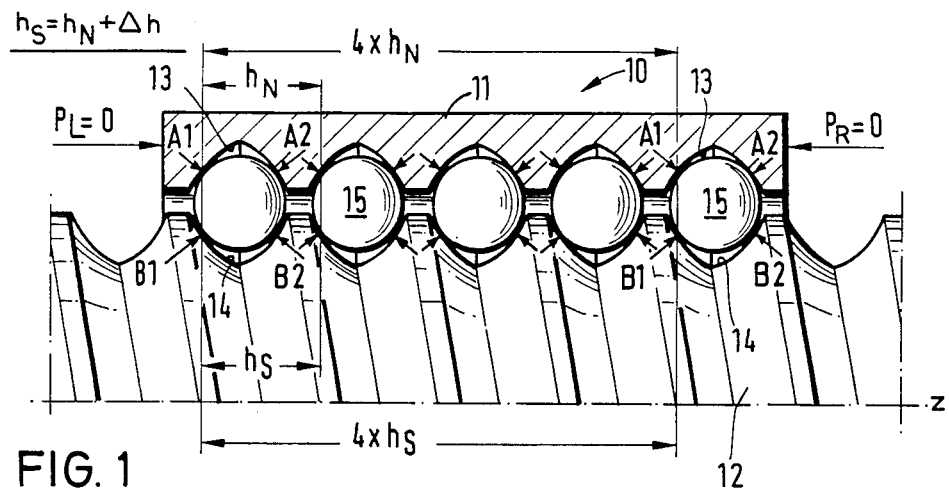
FIG. 1 is an axial sectional view of half a circulating-ball drive embodying our invention, shown in an unloaded position.

The assembly shown in the drawing, generally designated 10, comprises a nut 11 with a helical inner groove 13 of several turns confronting respective turns of an outer groove 14 of an associated leadscrew or spindle 12. The two grooves 13 and 14 are of constant, mutually symmetrical profiles with pointed arches of the "Gothic" type, e.g. as known per se from FIG. 1.2 of the above-identified German publication. The symmetrical flanks of each groove profile define a pair of helical contact lines bracketing a multiplicity of identical bearing balls 15 between them. Under no-load conditions, as illustrated in FIG. 1, each ball 15 is therefore in contact with nut 11 and spindle 12 at four points lying at the corners of a rectangle, namely points A1 and A2 of groove 13 and points B1 and B2 of groove 14. Nut 11 is further provided with one or more nonillustrated return passages for the recirculation of the balls, as is well known in the art.

In accordance with our present invention, the turns of helical groove 13 prior to assembly have a pitch $h_N$ which is very slightly less than the pitch $h_S$ of the turns of groove 14. The pitch difference $\Delta h = h_S - h_N$ is so small as to be unnoticeable in FIG. 1 in which the assembly is unloaded as indicated by zero axial forces $P_L$ and $P_R$ acting upon the nut 11 from the left and from the right. Under these circumstances the balls 15 are gripped uniformly at contact points A1, A2 and B1, B2 so as to be subjected to a certain compression in the direction of spindle axis Z; the balls so confined, accordingly, offer a certain but not significant resistance to relative rotation of the nut and the spindle. It is assumed that spindle 12 is virtually nondeformable in both axial and radial directions and that nut 11 is also radially nondeformable for practical purposes; to this end it may be desirable to encase the nut in a rigidifying shell as disclosed in our prior U.S. Pat. No. 4,080,011 referred to above. The pitch difference $\Delta h$ is such that nut 11 will be axially stretched, under all operating conditions, within the limits of its elastic deformability as given by the range of proportionality of Hooke's law.

Figure 2:
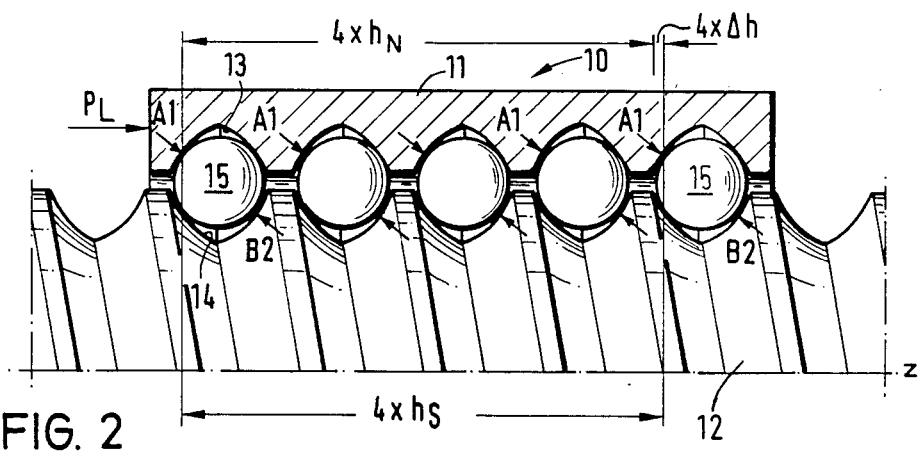
FIGS. 2 and 3 are views similar to FIG. 1, showing the assembly under axial pressure from opposite sides.

In FIG. 2 it has been assumed that a substantial axial force $P_L$ acts upon the nut 11, e.g. as a result of a rotation of spindle 12 in a sensetending to shift that nut to the left along with a nonillustrated load entrained thereby. The axial thrust thus exerted upon nut 11 causes a minute shift of the turns of its groove 13 to the right, relative to the confronting turns of spindle groove 14, whereby pressure upon the balls 15 is intensified at contact points A1 and B2 but is essentially relieved at the other contact points A2 and B1 shown in FIG. 1, tending toward zero under maximum load. An opposite thrust, exerted by a relative pressure $P_R$, has been illustrated in FIG. 3 which shows the balls 15 in strong contact with nut 11 only at points A2 and with spindle 12 only at points B1, the points A1 and B2 remaining contact points with relieved force as described. The cumulative pitch difference between four turns of groove 13 in the unstressed state of nut 11 and as many turns of groove 14 will be $4h_S - 4h_N = 4\Delta h$ as diagrammatically and exaggeratedly indicated in FIGS. 2 and 3.

Figure 3:
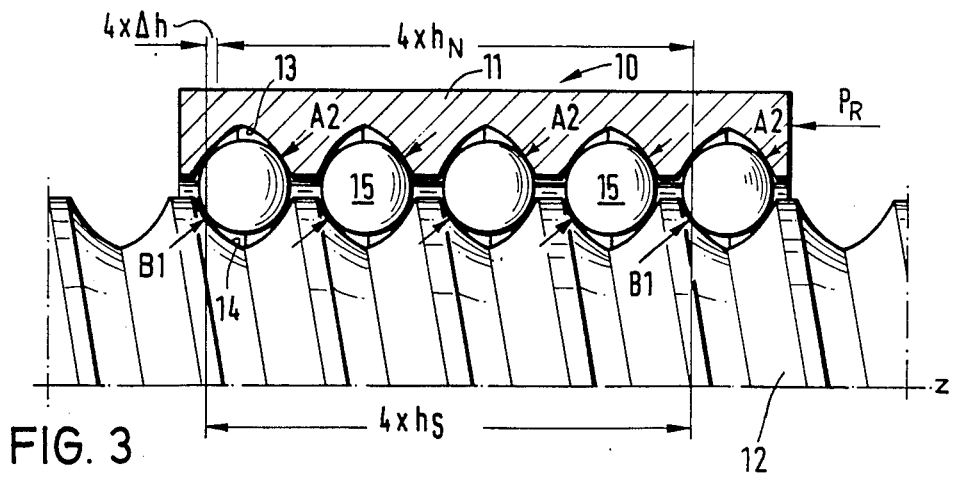

The two-point strong contact and two-point relieved contact existing in the loaded positions of FIGS. 2 and 3 reduces the rolling resistance of the balls 15 so as to enable an easier relative rotation of the spindle and the nut.

In a specific example, pitch $h_X = 10$ mm and pitch $h_n = 9.998$ mm which corresponds to a differential $\Delta h = 2\mu$ or 0.02%. This differential is of the order of magnitude of the usual machining tolerances, ranging between about 0 and $4\mu$, which are absorbed by the elastic deformability of the balls and their guide tracks. Whereas, however, the deviations from a true helical path due to these tolerances will generally cancel one another in the several turns, the pitch differential $\Delta h$ is cumulative so as to amount to $8\mu$ over the distance indicated in FIGS. 2 and 3.

As will be readily apparent from the foregoing description, the elastic axial deformation of nut 11 due to the pitch differential results in a virtually uniform distribution of force $P_L$ or $P_R$ upon the balls 15 occupying the several turns of nut groove 13. The described nut structure, therefore, is bilaterally effective in a manner comparable to that of conventional double nuts of the "O" or "X" type (with contact pressures exerted upon the balls in directions diverging or converging toward the axis), e.g. as shown in FIG. 2.5 of the above-identified German publication, while being considerably more compact and easier to machine.

The illustrated Gothic groove profiles may be modified as long as each groove has two flanks making only symmetrical point contact with the confined balls under no-load conditions.

We claim:

1. A circulating-ball drive comprising a spindle, a unitary one-piece nut coaxially surrounding said spindle along part of the length thereof, and a set of identical bearing balls interposed between said spindle and said nut, said spindle having a single outer helical groove of uniform cross-section with a multiplicity of turns, said nut having a single inner helical groove of uniform cross-section with a plurality of turns confronting respective turns of said outer groove and forming part of at least one closed track for the recirculation of bearing balls confined between the confronting turns, each of said turns having a profile with two symmetrical flanks engaging the confined bearing balls along a helical contact line whereby each confined ball is exclusively in two-point continuous contact with each of said spindle and said nut over the full length of a path for each ball in contact with both said spindle and said nut, the turns of said outer groove having a constant pitch over the length thereof exceeding by a small fraction the pitch of the turns of said inner groove which is constant over the length thereof in an unstressed state of said nut over the full length of said nut, with resulting uniform elastic axial deformation of said nut upon assembly so that under all operating conditions said grooves engage each ball with four-point contact exclusively during the travel of each ball over the length of said spindle.

2. A circulating-ball drive as defined in claim 1 wherein the pitch of said outer groove exceeds the pitch of said inner groove by a differential on the order of one-hundredth of one percent.

3. A circulating-ball drive as defined in claim 1 wherein said confronting turns have mutually symmetrical profiles.

4. A circulating-ball drive as defined in claim 3 wherein said profiles are in the shape of pointed arches.

* * * * *